United States Patent Office 2,870,063
Patented Jan. 20, 1959

2,870,063

X-RAY CONTRAST COMPOSITION COMPRISING SUBSTANTIALLY AMYLOSE-FREE AMYLOPECTIN IN AQUEOUS SOLUTION OF CONTRAST AGENT

George B. De La Mater, St. Johns, Mo., assignor to Mallinckrodt Chemical Works, St. Louis, Mo., a corporation of Missouri No Drawing. Application July 5, 1955
Serial No. 520,127

5 Claims. (Cl. 167—95)

This invention relates to contrast media and more particularly to roentgenographic preparations.

Briefly, the present invention is directed to a roentgenographic preparation comprising an aqueous solution of a water-soluble X-ray contrast agent and as a viscosity-increasing agent an amylopectin substantially free from amylose, the solution having a viscosity greater than approximately 6 centipoises.

Among the objects of the present invention may be mentioned the provision of improved roentgenographic preparations of a wide range of viscosities; the provision of such preparations containing as a thickening agent an amylopectin substantially free from amylose, which agent is compatible with conventional water-soluble X-ray contrast agents, physiologically harmless and hydrolyzed by body fluids to yield innocuous glucose; the provision of preparations of this type which retain their viscosity for a sufficient period of time thereby permitting adequate radiographic examination, and yet are assimilated or eliminated by the body within a few hours; the provision of preparations of this character which are safe and effective and do not require the use of special radiographic techniques; the provision of such preparations which are clear, uniform in texture, and have easily controlled properties and characteristics; the provision of preparations of this type which are nontoxic and nonirritating; and the provision of such preparations which are stable under ordinary conditions of storage and use. Other objects and features will be in part apparent and in part pointed out hereinafter.

The invention accordingly comprises the products hereinafter decsribed, the scope of the invention being indicated in the following claims.

Thickened aqueous mixtures of X-ray contrast agents have previously been known and the use of various thickening agents in such preparations has been tried or proposed. However, the thickening agents employed heretofore have been deficient in one or more of the properties essential to a satisfactory and effective roentgenographic preparation. Thus, the use of ordinary starch has been proposed, but this material is objectionable because of its tendency to form pasty, lumpy solutions which are aesthetically undesirable and not sufficiently smooth and uniform to give satisfactory contrast in practice. Also, these ordinary starch solutions tend to clog syringes and accordingly are difficult to handle. Dextran has also been employed as a thickening agent in roentgenographic preparations, but is eliminated so slowly from the body that vital organs, particularly the liver, may retain substantial amounts of dextran for a long enough period of time to cause undesirable and perhaps serious foreign body reactions. Similarly, polyvinylpyrrolidone possesses the same disadvantages as dextran but to a somewhat greater degree, thereby increasing the risk of foreign body reactions. In like manner, sodium carboxymethylcellulose and similar cellulose derivatives are unsatisfactory as thickening agents, since they are not assimilated by normal body processes and, therefore, may remain in the body as foreign matter permanently or for undesirably long periods of time. A conventional thickening agent, algin, has also been found unsuitable because it reacts with calcium to produce an insoluble precipitate and, therefore, would be harmful if accidentally injected into a vein. Thus, the thickening agents employed heretofore suffer from one or more objectionable properties which detract from their usefulness.

In accordance with the present invention, it has now been found that the above-noted difficulties can be overcome and improved results obtained by the use of aqueous preparations which include water-soluble X-ray contrast agents and as a viscosity-increasing agent an amylopectin substantially free from amylose. Roentgenographic preparations of a wide range of viscosities and other physical characteristics can thereby readily be obtained. Amylopectins substantially free from amylose are physiologically harmless, compatible with conventional water-soluble X-ray contrast agents, nontoxic and nonirritating, stable under ordinary conditions of storage and use, and produce thickened solutions which are clear, uniform in texture and have easily controlled properties and characteristics. Furthermore, the material possesses the valuable property of being hydrolyzed by body fluids within a few hours after introduction into the body to yield glucose which is physiologically innocuous. However, this hydrolysis does not occur so rapidly that the thickened solutions lose their desirable properties before adequate radiographic examinations can be made without the necessity for employing special techniques or equipment. Thus, the roentgenographic preparations of the invention retain their viscosity for a sufficient period of time, and yet are assimilated or eliminated within a relatively short time, leaving no trace of unabsorbed foreign material to cause undesirable and possibly hazardous reactions in any of the body organs.

Further, it has been found that roentgenographic preparations of the present invention, even though viscous, are easy to handle, and can readily be injected into a hollow organ in the body using a conventional syringe or like instrument. Once injected, the solutions tend to remain in place, thereby permitting longer and more satisfactory X-ray visualization of that organ or cavity. Thus, solutions thickened with an amylopectin substantially free from amylose can be readily injected, even through needles of relatively fine bore, but when the force supplied by the bulb or plunger of the syringe is removed, the thickened solutions are retained in place for a sufficient period of time to permit adequate examination.

The novel roentgenographic preparations of the present invention comprise an aqueous solution of a water-soluble X-ray contrast agent and as a viscosity-increasing agent an amylopectin substantially free from amylose, the solution having a viscosity greater than approximately 6 centipoises. The term "amylopectin substantially free from amylose" includes all forms of amylopectins, whether undegraded or degraded, which contain less than approximately 5% by weight of amylose and preferably contain not more than about 3% amylose. Amioca is a commercially available, naturally occurring form of amylopectin substantially free from amylose and is obtainable from a hybrid corn known as waxy maize. It differs from other starches, such as corn starch and potato starch, which contain 20–30% amylose, a linear component of ordinary starch unlike amylopectin, which is a branched chain component. Amioca, as commercially available, may contain small amounts of amylose, e. g., 1 to 2% by weight.

It is preferred in the practice of the present invention to use partially degraded amioca, which is also commercially available. Such a partially degraded starch is commonly prepared by heating the starch at a temperature of about 120° F. with dilute sulfuric acid (approximately 0.65% sulfuric acid based on the weight of the starch). When the starch has been degraded to the desired extent, the excess acid is neutralized with sodium carbonate and dilute caustic, and the starch is filtered, washed and dried. Among the forms of partially degraded amioca which are suitable for use in the preparations of this invention are those known by the commercial designations amioca-20 and amioca-50. These two forms of partially degraded amioca contain only approximately 1.5% by weight of amylose. Amioca-50, for example, has a viscosity of approximately 24.8–29.0 seconds when determined by the following method: A sample (13.0 g.) of starch containing 13% moisture is cooked with distilled water (100 ml.) in a copper beaker for twenty minutes in a boiling water bath, the water lost by evaporation being replaced. The viscosity of the resulting solution is determined with a Stormer viscosimeter at 80° C., having the bobbin weight adjusted so that a standard solution of 31.60 centipoises tests 23.0 seconds for 100 R. P. M. at 30° C. A concentration of approximately 10% of amioca-50 has an effect on viscosity equivalent to that of 3% undegraded amioca. It will be understood that, wherever the above-noted viscosity range of amioca-50 is referred to herein, such viscosity was determined by this method.

In accordance with the invention, a greater or smaller proportion of undegraded amioca or partially degraded amioca may be included in an aqueous solution of a water-soluble X-ray contrast agent depending on the desired viscosity of the finished roentgenographic preparation. If a solution of low viscosity is desired, for example, partially degraded amioca or mixtures of several forms thereof may be used alone or in combination with small amounts of undegraded amioca. This gives a smooth, uniform, aqueous solution. Thus, amioca-20 has an average molecular weight such that a concentration of approximately 10% has an effect on viscosity equivalent to that of 15% amioca-50. On the other hand, undegraded amioca per se or mixtures of partially degraded amioca with a greater proportion of the undegraded amioca may be included to produce solutions of higher viscosity which are sometimes desirable for certain roentgenographic techniques. It is generally preferred that the roentgenographic preparations of this invention contain at least approximately 0.5% by weight of an amylopectin substantially free from amylose.

Any water-soluble X-ray contrast agent or mixtures thereof may be included in the roentgenographic preparations of the present invention. As an optional component, compatible preservatives, such as para-hydroxybenzoates, e. g., methyl p-hydroxybenzoate, may also be included in the roentgenographic preparations of the present invention.

These novel roentgenographic preparations are particularly useful for many roentgenographic procedures, e. g., urethrography, hysterosalpingography, cholangiography, bronchography, fistulography, and sialography.

While the roentgenographic preparations of the invention are primarily intended for use in visualizing cavities and passages in the body having an exterior opening, they may also be employed for visualization of organs and systems within the body having no such opening. For example, they may be injected directly into veins or arteries in which case the viscosity of the solution tends to retard the dispersion of the preparation into the blood stream, thus providing a radiopaque bolus whose course through the veins or arteries can be followed by means of radiographic techniques.

The following examples illustrate the invention:

EXAMPLE 1

A roentgenographic preparation having the following composition was prepared:

| Component: | Amount |
|---|---|
| 70% sodium acetrizoate solution ml | 2142 |
| Pyrogen-free water ml | 600 |
| Partially degraded amioca (known by the commercial designation amioca-50) g | 450 |
| Methyl p-hydroxybenzoate g | 2.10 |

The mixture of the above components was heated on a steam bath until the amioca was completely dispersed and then sterilized by autoclaving.

The final preparation contained 47.2% (w./v.) sodium sodium acetrizoate; the viscosity at 25° C. using a Brookfield viscosimeter with a No. 2 spindle at 10 R. P. M. was 2184 centipoises.

EXAMPLE 2

A roentgenographic preparation having the following composition was prepared:

| Component: | Amount |
|---|---|
| 70% sodium acetrizoate solution ml | 6420 |
| Pyrogen-free water ml | 1540 |
| Partially degraded amioca (known by the commercial designation amioca-50) g | 1275 |
| Methyl p-hydroxybenzoate g | 5.9 |

The mixture of the above components was treated in the manner described in Example 1.

The final preparation contained 50.21% (w./v.) sodium acetrizoate, and had a viscosity at 25° C. of 2672 centipoises when determined by the method described in Example 1.

EXAMPLE 3

A roentgenographic preparation having the following composition was prepared:

| Component: | Amount |
|---|---|
| 30% sodium acetrizoate solution ml | 100 |
| Undegraded amioca g | 5 |
| Partially degraded amioca (known by the commercial designation amioca-50) g | 5 |

The viscosity of the unautoclaved preparation at 37° C. using a Brookfield viscosimeter with a No. 2 spindle at 4 R. P. M. was 3250 centipoises.

EXAMPLE 4

A roentgenographic preparation having the following composition was prepared:

| Component: | Amount |
|---|---|
| 30% sodium acetrizoate solution ml | 100 |
| Undegraded amioca g | 2.5 |
| Partially degraded amioca (known by the comcial designation amioca-50) g | 7.5 |

The viscosity of the unautoclaved preparation at 37° C. was 1250 centipoises when determined by the method described in Example 3.

EXAMPLE 5

A roentgenographic preparation having the following composition was prepared:

| Component: | Amount |
|---|---|
| 70% sodium acetrizoate solution ml | 100 |
| Partially degraded amioca (known by the commercial designation amioca-20) g | 0.5 |

The viscosity of the unautoclaved preparation at 25° C. was 6 centipoises when determined using an Ostwald viscosimeter.

EXAMPLE 6

A roentgenographic preparation having the following composition was prepared:

| Component: | Amount |
|---|---|
| 70% sodium acetrizoate solution ml | 100 |
| Partially degraded amioca (known by the commercial designation amioca-20) g | 1 |

The viscosity of the unautoclaved preparation at 25° C. was 10 centipoises when determined by the method described in Example 5.

EXAMPLE 7

A roentgenographic preparation having the following composition was prepared:

Component: Amount
    70% sodium acetrizoate solution_____ml__ 100
    Partially degraded amioca (known by the comcial designation amioca-20)_____g__ 5

The viscosity of the unautoclaved preparation at 25° C. was 440 centipoises when determined by the method described in Example 5.

EXAMPLE 8

A roentgenographic preparation having the following composition was prepared:

Component: Amount
    70% sodium acetrizoate solution_____ml__ 100
    Partially degraded amioca (known by the commercial designation amioca-20)_____g__ 5

The preparation was heated for several hours at 90–100° C. The viscosity at 25° C. was 290 centipoises when determined by the method described in Example 5.

EXAMPLE 9

A roentgenographic preparation having the following composition was prepared:

Component: Amount
    70% sodium acetrizoate solution_____ml__ 100
    Partially degraded amioca (known by the comcial designation amioca-20)_____g__ 10

The preparation was heated for several hours at 90–100° C. The viscosity at 25° C. was 2500 centipoises when determined by the method described in Example 5.

EXAMPLE 10

A roentgenographic preparation having the following composition was prepared:

Component: Amount
    30% sodium acetrizoate solution_____ml__ 100
    Partially degraded amioca (known by the commercial designation amioca-20)_____g__ 5

The preparation was sterilized in an autoclave. The viscosity of the preparation at 25° C. was 90 centipoises when determined using a Brookfield viscosimeter with a No. 2 spindle at 5 R. P. M.

EXAMPLE 11

A roentgenographic preparation having the following composition was prepared:

Component: Amount
    30% sodium acetrizoate solution_____ml__ 100
    Partially degraded amioca (known by the commercial designation amioca-20)_____g__ 10

The preparation was sterilized in an autoclave. The viscosity of the preparation at 25° C. was 4700 centipoises when determined by the method described in Example 10.

EXAMPLE 12

A roentgenographic preparation having the following composition was prepared:

Component: Amount
    30% sodium acetrizoate solution_____ml__ 100
    Partially degraded amioca (known by the commercial designation amioca-20)_____g__ 15

The prepartion was sterilized in an autoclave. The viscosity of the preparation at 25° C. was 10,500 centipoises when determined by the method described in Example 10.

The roentgenographic preparations listed in the following table were also prepared and found to be useful.

Table I

| X-ray Contrast Agent | Concentration of Solution, percent, | Volume of Solution, ml. | Amount of Amioca-50 Added, g. |
|---|---|---|---|
| Diethanolamine salt of 3,5-diiodo-4-pyridone-N-acetic acid | 70 | 25 | 3.75 |
| Do | 70 | 25 | 1.25 |
| Do | 35 | 30 | 4.50 |
| Sodium iodomethansulfonate | 40 | 25 | 1.25 |
| Sodium 3,5-diacetylamino-2,4,6-triiodobenzoate | 50 | 30 | 4.50 |
| Do | 50 | 30 | 1.50 |
| Sodium iodomethamate | 75 | 20 | 3.00 |
| Do | 75 | 20 | 1.00 |
| Do | 50 | 20 | 3.00 |
| Do | 50 | 20 | 1.00 |
| Sodium 3,5-dipropionylamino-2,4,6-triiodobenzoate | 50 | 30 | 3.75 |
| Do | 50 | 30 | 1.25 |
| Disodium lead complex of ethylenediaminetetraacetic acid | 40 | 25 | 3.75 |
| Do | 40 | 25 | 1.25 |
| Sodium o-iodohippurate | 48 | 25 | 3.75 |
| Do | 48 | 25 | 1.25 |

It will be understood, of course, that other water-soluble X-ray contrast agents may be used in the same manner and give useful roentgenographic preparations. It will also be understood that, as autoclaving tends to decrease somewhat the viscosity of these roentgenographic preparations, it may be desirable to increase the initial viscosity of the preparations. This can be done, for example, by increasing the quantity of an amylopectin substantially free from amylose or by using higher proportions of undegraded amioca or by employing forms of partially degraded amioca having a higher viscosity.

Rats were injected intravenously with 4.24 ml./kg. of the roentgenographic preparation described in Example 2. No mortalities occurred. Throughout the 48-hour observation period, the animals exhibited normal behavior and appearance and at the time of sacrifice showed an increase in average body weight. There was no evidence of irritation at the site of injection. At gross autopsy, the organs of all animals were within normal limits.

Rats were injected intraperitoneally with 0.858 ml./kg. of the roentgenographic preparation described in Example 2. No mortalities occurred. Throughout the 48-hour observation period, the animals exhibited normal behavior and appearance, and at the time of sacrifice showed an increase in average body weight. At gross autopsy the organs of all animals were within normal limits and there was no peritoneal irritation.

In view of the above, it will be seen that the several objects of the invention are achieved and other advantageous results attained.

As various changes could be made in the above products without departing from the scope of the invention, it is intended that all matter contained in the above description shall be interpreted as illustrative and not in a limiting sense.

I claim:

1. A roentgenographic preparation comprising an aqueous solution of a water-soluble X-ray contrast agent and as a viscosity-increasing agent an amylopectin substantially free from amylose, said solution having a viscosity greater than approximately 6 centipoises.

2. A roentgenographic preparation comprising an aqueous solution of a water-soluble X-ray contrast agent and as a viscosity-increasing agent a mixture of an undegraded amylopectin substantially free from amylose and a partially degraded amylopectin substantially free from amylose, said solution having a viscosity greater than approximately 6 centipoises.

3. A roentgenographic preparation comprising an aqueous solution of a water-soluble X-ray contrast agent and as a viscosity-increasing agent a partially degraded amylopectin substantially free from amylose, said solution having a viscosity greater than approximately 6 centipoises.

4. A roentgenographic preparation comprising an aqueous solution of a water-soluble X-ray contrast agent and as a viscosity-increasing agent at least approximately 0.5% by weight of partially degraded amylopectin substantially free from amylose, said solution having a viscosity greater than approximately 6 centipoises.

5. A roentgenographic preparation comprising an aqueous solution of a water-soluble X-ray contrast agent, pyrogen-free water, as a viscosity-increasing agent partially degraded amylopectin substantially free from amylose having a viscosity of approximately 24.8–29.0 seconds and a preservative for the amylopectin, said solution having a viscosity of approximately 2700 centipoises.

References Cited in the file of this patent

UNITED STATES PATENTS

| | | |
|---|---|---|
| 1,984,404 | Ellzey | Dec. 18, 1934 |
| 2,319,637 | Schopmeyer | May 18, 1943 |
| 2,354,838 | Schopmeyer | Aug. 1, 1944 |
| 2,515,095 | Schoch | July 11, 1950 |

FOREIGN PATENTS

| | | |
|---|---|---|
| 478,108 | Great Britain | Jan. 12, 1938 |
| 273,245 | Switzerland | Jan. 31, 1951 |
| 658,467 | Great Britain | Oct. 10, 1951 |

OTHER REFERENCES

Hackh's Chem'l. Dictionary, 3rd ed., 1944, pp. 53, 372, 802, McGraw-Hill, New York, N. Y.